United States Patent [19]

Bürge et al.

[11] Patent Number: 5,447,096
[45] Date of Patent: Sep. 5, 1995

[54] HORIZONTALLY AND VERTICALLY MOVABLE GRIDIRON

[76] Inventors: Philippe Bürge; Patricia Bürge, both of Grundweg, CH-9527 Niederhelfenswil, Switzerland

[21] Appl. No.: 240,714
[22] PCT Filed: Sep. 7, 1993
[86] PCT No.: PCT/CH93/00218
§ 371 Date: May 9, 1994
§ 102(e) Date: May 9, 1994
[87] PCT Pub. No.: WO94/05192
PCT Pub. Date: Mar. 17, 1994

[30] Foreign Application Priority Data

Sep. 9, 1992 [CH] Switzerland .............. 02841/92

[51] Int. Cl.⁶ .......................... A47J 37/07; F24B 1/18
[52] U.S. Cl. ............................. 99/339; 99/340; 99/397; 99/449; 99/450; 126/9 R; 126/25 A; 126/30
[58] Field of Search ................ 99/444–446, 99/449, 398, 450, 339, 482, 340, 357, 397, 402; 126/25 R, 25 A, 9 R, 9 B, 30

[56] References Cited

U.S. PATENT DOCUMENTS

| | | | |
|---|---|---|---|
| 2,297,825 | 10/1942 | Bobo | 99/397 |
| 2,846,941 | 8/1958 | Goodwin | 99/450 |
| 3,067,734 | 12/1962 | Lucas . | |
| 3,498,210 | 3/1970 | O'Toole . | |
| 3,559,565 | 12/1968 | Getz | 99/397 |
| 3,867,877 | 2/1975 | Zajc | 99/402 |
| 4,083,354 | 4/1978 | Claire et al. | 126/25 A |
| 4,338,912 | 7/1982 | Gaskins | 126/9 R |
| 4,363,313 | 12/1982 | Smith . | |
| 4,479,422 | 10/1984 | Wagstaff | 99/398 |
| 4,492,152 | 1/1985 | DeSantis | 99/449 |
| 4,562,771 | 1/1986 | Williams | 99/427 |
| 4,884,499 | 12/1989 | Rensch et al. | 126/9 R |
| 5,103,799 | 4/1992 | Atanasio | 126/9 R |

FOREIGN PATENT DOCUMENTS 2849243  5/1980  Germany .

Primary Examiner—Timothy F. Simone
Attorney, Agent, or Firm—Cushman, Darby & Cushman

[57] ABSTRACT

A gridiron (1) is movable both vertically and horizontally and can thus be moved in space with a single handle. A locking device consisting of a simple screw or clampdevice may be provided to securely hold the gridiron in a determined position. The movability of the gridiron (1) is achieved using a parallelogram device (9–16) by means of which the gridiron (1) remains horizontal in all positions. The disclosed gridiron design allows food to be placed and removed from the gridiron much more easily and also the cooking stage of individual parts of the grilled foods to be checked. In addition, the grilled foods can be swivelled to a serving, so that the guest may choose the piece they wish. The gridiron (1) is provided with a holding device (17–20) which can be mounted either directly on a garden grill or on a separate stand.

10 Claims, 6 Drawing Sheets

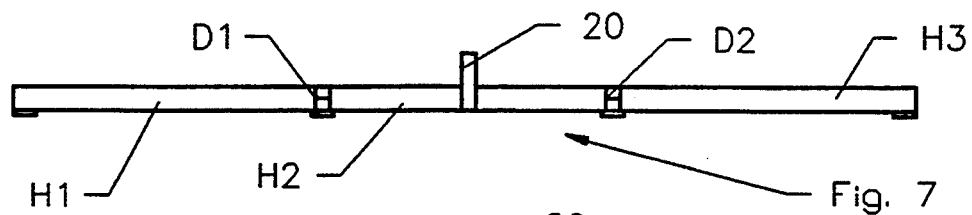
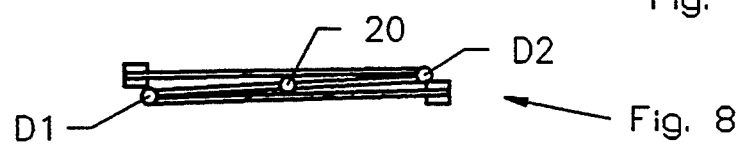
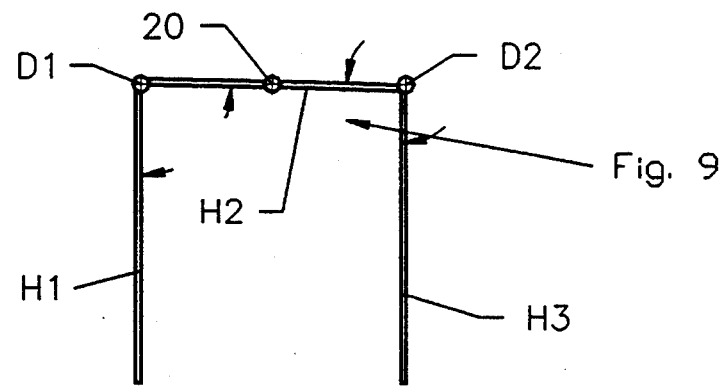
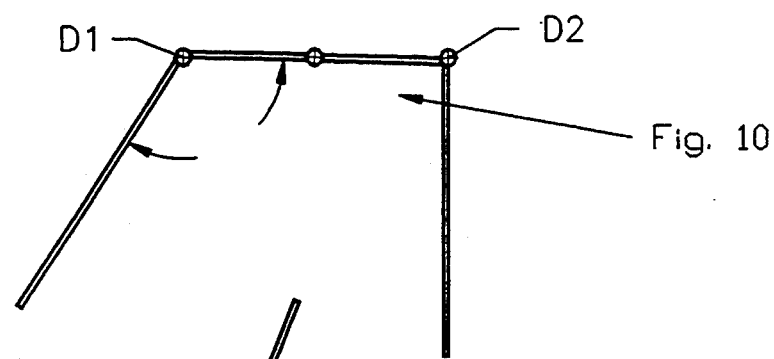
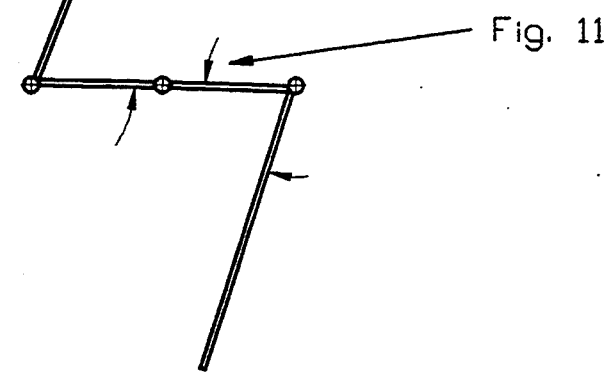

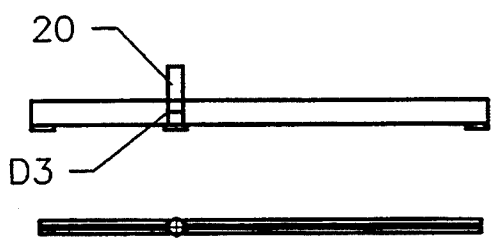
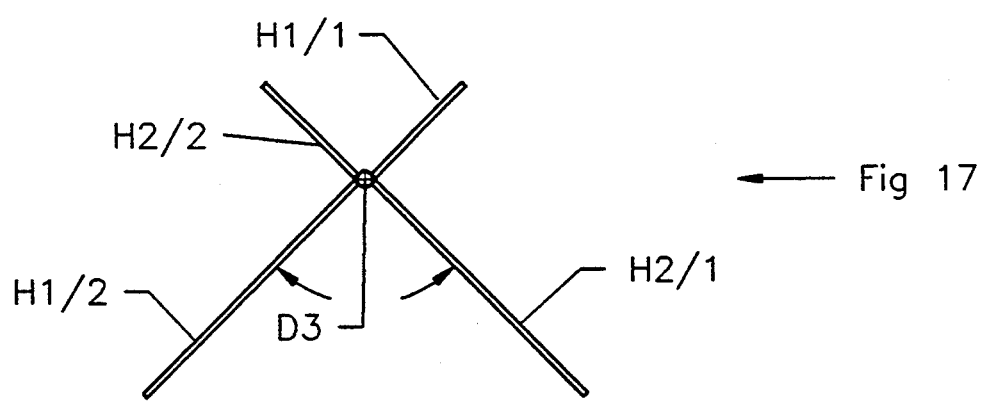

1

HORIZONTALLY AND VERTICALLY MOVABLE GRIDIRON

FIELD OF THE INVENTION

This invention relates to a gridiron for open fireplaces, as indoor and outdoor fireplaces, heated by means of wood or charcoal.

BACKGROUND OF THE INVENTION

Known gridirons of this kind are movable only in the vertical direction and are used for moving the gridiron to and from the source of heat and serve to increase or reduce the distance of the gridiron to the wood or charcoal, so that the grilled with the gridiron substance is treated at a suitable temperature. This vertical movement is not sufficient in cases in which pieces requiring different heat are placed on the same gridiron, as is usual on most garden parties.

It is, as an example, possible that in one place on the gridiron thin cutlets are placed and that in other places thicker pieces of meat requiring more intensive heat are located. For that reason it is convenient, if the gridiron can so be placed, that the most heat intensive places of the fireplace are directed toward the meat chunks demanding the highest roasting or frying temperature.

Often it is desired to swing the gridiron with the roasted food thereon away from the heat for serving or for reloading with food to be roasted. This is so, because the heat and the sparks from the fire may cause damage to the clothing of persons standing nearly.

Also, it is much easier to check the roasted food when it is not over but on the side of the fireplace, because heat, sparks and smoke do not prevent an exact view of the food on the gridiron.

Forthermore, it is almost impossible to move a gridiron over and sidewise with regard to protective meshed wires placed around the grid, as is customary on most outdoor or indoor fireplaces for roasting and heating purposes.

A further problem connected with the raising and lowering of the gridiron is caused by the fact that most embodiments are designed for a certain height above the floor or ground level and for a certain outdoor grills and therefore are not suitable for indoor use.

Finally, it is a disadvantage of existing gridirons that they offers no possibilities for keeping roasted food hot for a while until it is needed for serving. This implies that the food must be eaten when it is ready or it gets overheated or cold. It is difficult to keep the food warm without overheating until it is being needed.

An object of this invention is to develop a gridiron, that is movable, not only in the vertical, but also in the horizontal direction or tridimensionally by means of a single handle.

A further object of this invention is that the said gridiron should be able to carry an additional grid for keeping some food, e.g. meat, warm until it is being served together with vegetables requiring less cooking time. Also, it should be possible to use the additional grid for the roasting or cooking of vegetables, which do not need as an extensive heat as thick chuncks of meat.

SUMMARY OF THE INVENTION

In one aspect, this invention is a gridiron for indoor and outdoor fireplaces, characterized in that it is movable vertically as well as horizontally by means of a single handle, that the vertical movement is carried out by means of a parallelogram device, that the gridiron remains in a horizontal plane in any position, and that the parallelogram device can be locked in any vertical or horizontal position by means of a locking device.

In another aspect, the gridiron is characterized in that the parallelogram device has two parallel supports, each rotatable arranged on a vertical arm that can be swiveled over a horizontal rocking lever and a vertical pivot in a sleeve. In yet another aspect, the gridiron is characterized in that the rocking lever for the extension of the turning radius consists of two extendable support rods which are connected with each other in a swivel point in which they can be held together by means of a clamping device.

In a further aspect, the gridiron is characterized in that the locking device comprises a permanent half-circular gear in which an adjustable hook engages that can be moved upwardly by transmitting means. In another aspect, the gridiron is characterized in that the transmitting means consists of a cable pull device.

In some preferred embodiments, the gridiron is characterized in that the sleeve is fastened onto a garden grill or an indoor fireplace.

In some preferred embodiments, the gridiron is characterized in that the sleeve is mounted on an independent stud, that is freely movable and possess a high resistance against tilting.

In some preferred embodiments, the gridiron is characterized in that the sleeve is mounted on a foldable foot consisting of plates.

In some preferred embodiments, the gridiron is characterized in that the vertical swiveling range of the handle is adjustable to the need of the operating person.

In some preferred embodiments, the gridiron is characterized in that on the top thereof it is provided with an additional grid for receiving food to be kept warm.

As compared with the existing designs, the embodiment according to the present invention possesses the following advantages:
 its use is not limited to a certain type of in- or outdoor grill,
 it can be moved from a holder in an indoor grill to a holder in an outdoor grill,
 provided with a foot, it can be installed anywhere,
 it can be adjusted in height by inserting or removing portions of the rotating axle,
 it can be lowered to the floor or the ground of any fireplace without the need for the person handling the grid to bend down or stretch, and
 it can be provided with an additional gridiron for the purpose of receiving food to be kept warm.

In the preferred embodiment, the gridiron keeps its horizontal position under all circumstances when moved tridimensionally. By means of a lever system the gridiron can be moved into any position for loading and unloading of food, and for checking the roasting thereof. The gridiron remains in its last position until it is again operated by means of the handle. In order to keep the gridiron in a certain position, locking means, e.g. in the form of a rack and pinion arrangement, are being provided.

BRIEF DESCRIPTION OF THE DRAWINGS

In the following an embodiment of the invention is described with reference to the drawings in which FIG. 7 shows an expanded support foot for the gridiron, FIG. 8 shows the support foot of FIG. 7 folded together, FIGS. 9–11 show different arrangements of the support foot according to FIG. 7, and FIGS. 12–17 show an embodiment of the support foot according to FIGS. 7 to 11.

DESCRIPTION OF THE PREFERRED EMBODIMENTS

Figure 1:
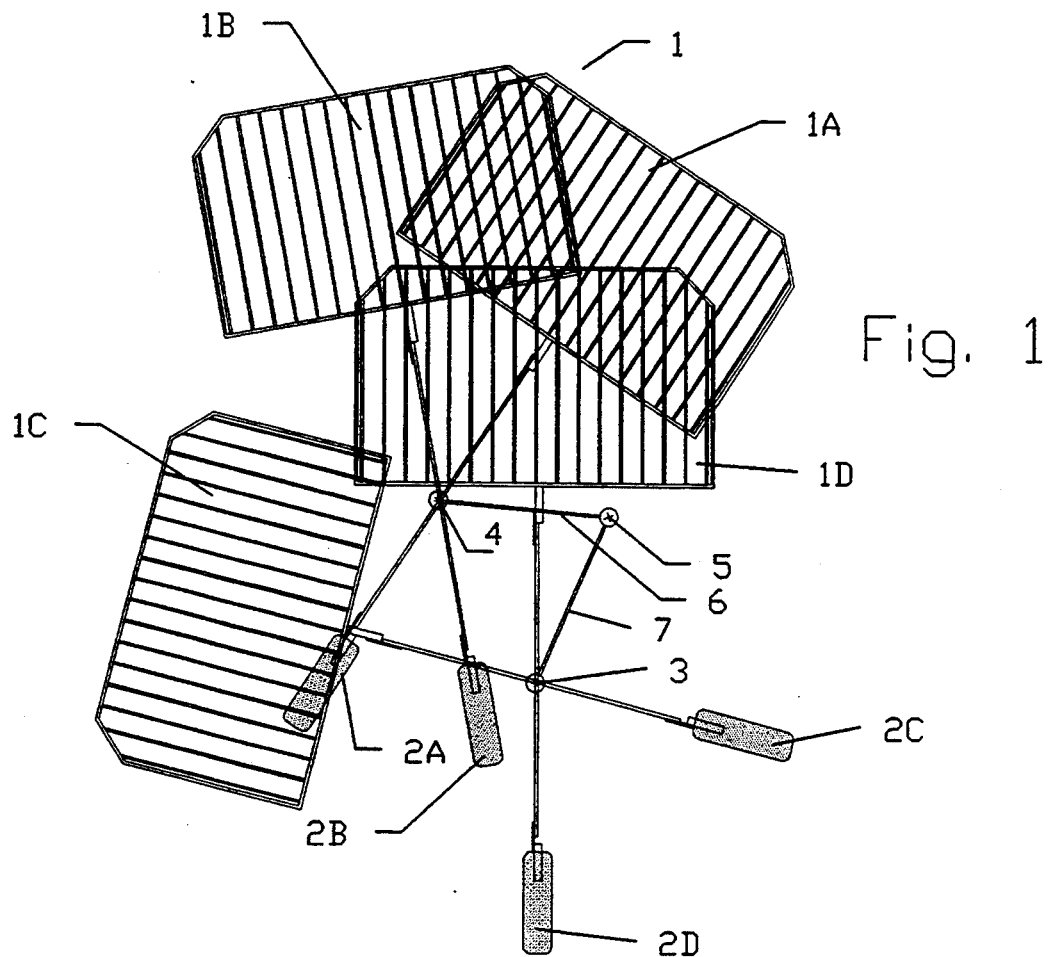
FIG. 1 shows a top view of a gridiron in different positions over and on the side of the fireplace.

FIG. 1 shows a gridiron 1 in different positions 1A to 1D and with a handle 2 in corresponding positions 2A to 2D. Both positions C and D have a common center 3 of rotation and both positions A and B a common center of rotation 4. Two support levers 6 and 7 connect bother centers 3,4 of rotation via a swivel point 5. This means that both support levers 6,7 can be folded together and separated from each other, so that the gridiron 1 in the separated position can describe a much larger diameter than in the retracted position. For the extension of the range it is only necessary to remove a screw (not shown in the drawing) of the joint or swivel point 5, whereby the stability of the support device 8 (FIG. 8) has to be considered.

Figure 2:
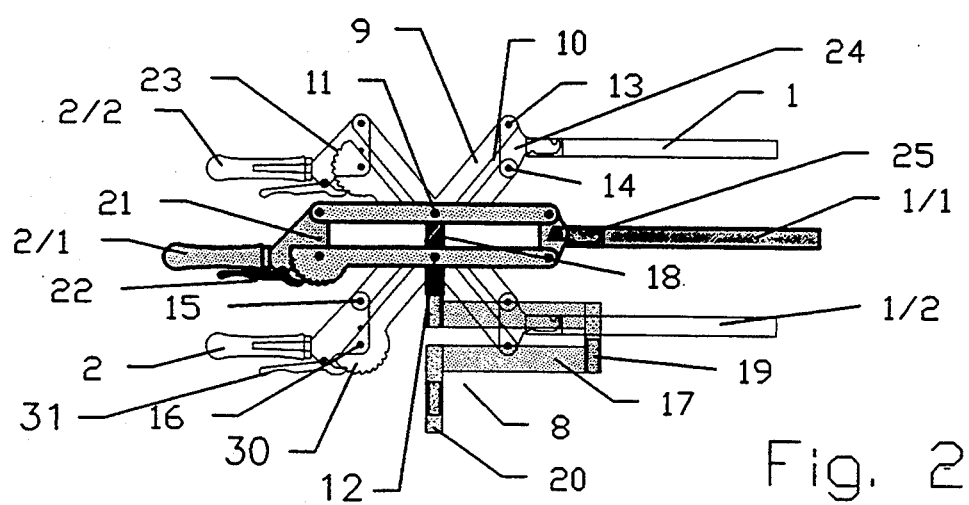
FIG. 2 shows a side view of the gridiron in three different height positions.

FIG. 2 shows a device for raising and lowering the gridiron 1, 1/1 and 1/2 by means of a handle 2, 2/1 and 2/2. This device comprises two parallel supports 9 and 10 rotatable in two bearings 11 and 12 so that the gridiron as well as the handle always are in a horizontal position. When the handle 2 is moved downward, the gridiron goes up, so that the food to be treated receives less heat. The handle 2 therefore causes a vertical movement for the regulation of the heat radiation onto the food.

The support device 8 consists of a vertical arm 18 onto which both supports 9 and 10 are rotatable fastened. At the bottom the arm 18 is fastened onto a horizontal lever 17, which is firmly connected with a pivot 19 that rotates in a sleeve 20. The lever 17 consists of one piece or of two swingable support bars 6 and 7. In the latter case the swivel radius is increased by the length of the lever 17. In the first case both rotating points fall together. The angle between both support bars 6,7 can be adjusted by means of a clamping device as desired.

Figure 3:
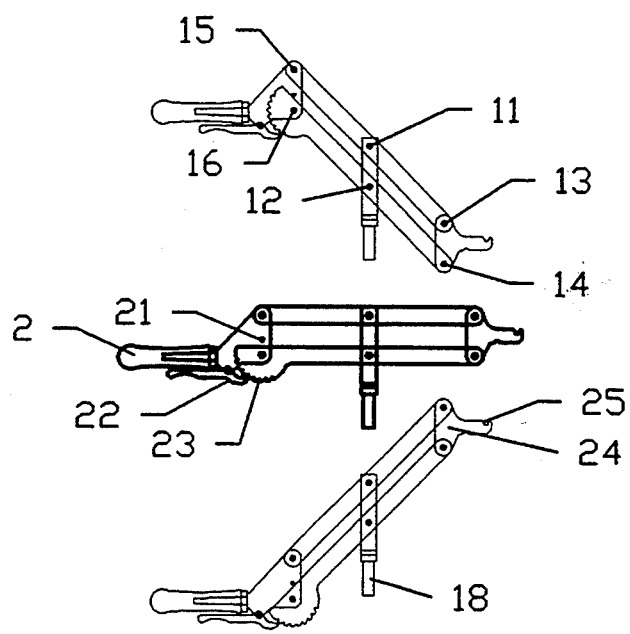
FIG. 3 shows an exploded view of the positions in FIG. 2.
Figure 4:
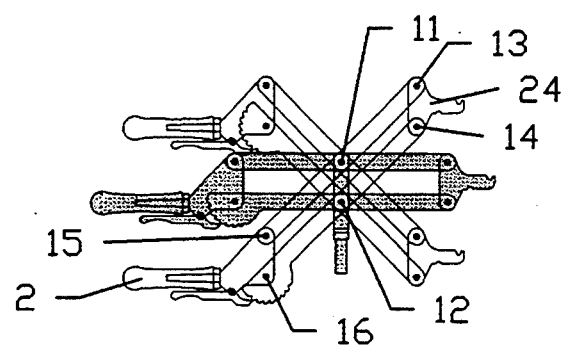
FIG. 4 shows an assembly of the embodiment according to FIG. 2.
Figure 5:
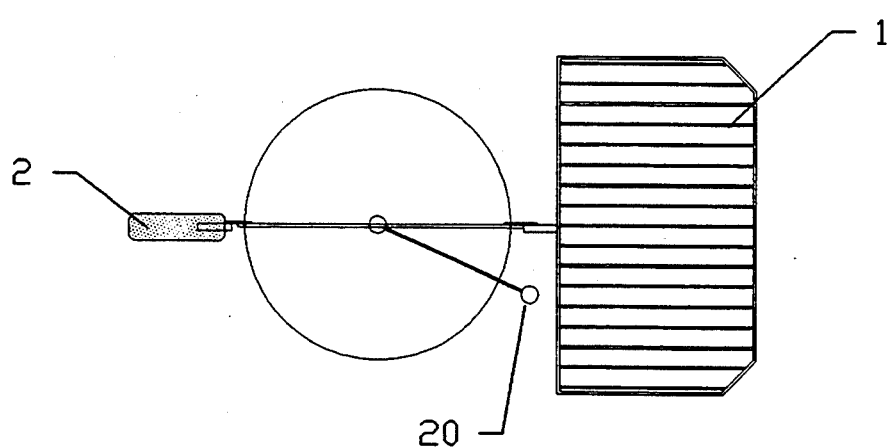
FIG. 5 shows a design with a firm support lever.

FIG. 3 and 4 show schematicly an arrangement of the parallelogram in the medium position and both end positions, but without the gridiron 1, and FIG. 5 shows the circular movement of the gridiron with regard to the jack 20.

Figure 6A:
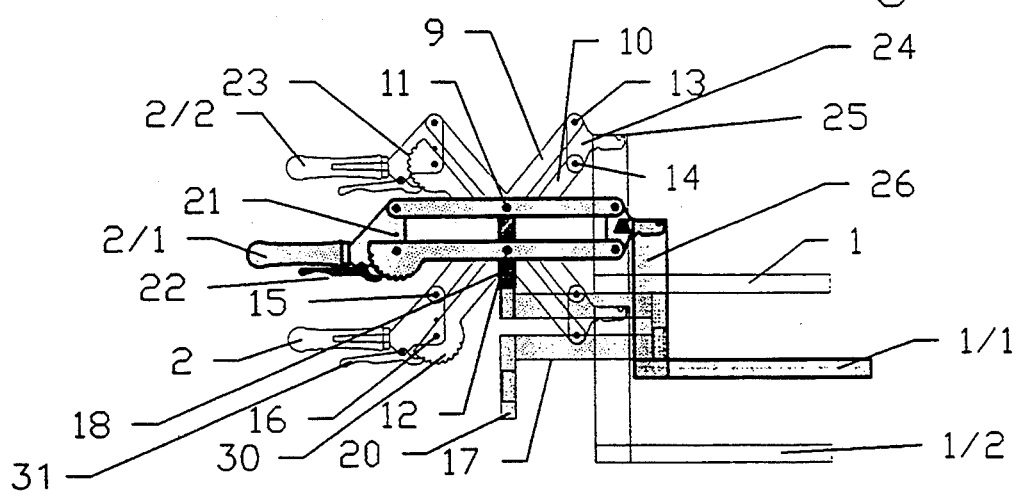
FIG. 6A shows the view of FIG. 2, but with the gridiron in a lower position.
Figure 6B:
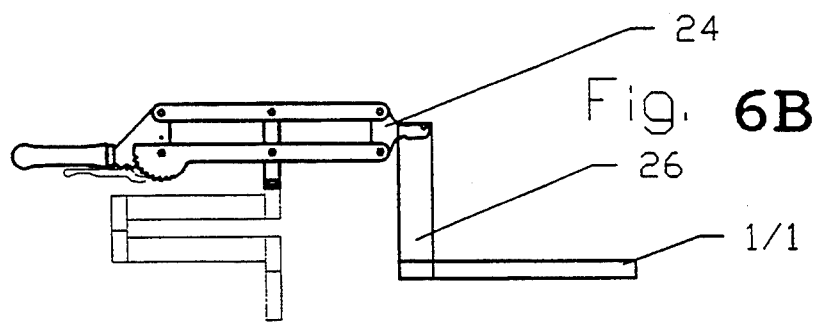
FIG. 6B shows the view of FIG. 6A but with only one gridiron position.

FIG. 6 (A and B2) show an embodiment of this invention that can be lowered over a protective screen in an indoor or outdoor open fireplace, so that the food is exposed to an appropiate heat. In this embodiment, a person handling the food can stand upright so that the operation of the equipment is facilitated. This design is particulary well suited for heat sources placed at a low level, as is frequently the case with indoor fireplaces.

The great advantage of the design described above is, that the gridiron, as compared with the prior art, can be moved much further, so that the gridiron is much easier to load and unload. The heat intensive portion of the grid area can be reserved for the thickest meat chunks and food requiring less heat can be placed where the heat is less intensive.

For unloading and reloading of food from and onto the gridiron, it can be rotated and/or swiveled up to the edge of the dining-table, so that party-guests can serve themselves directly from the gridiron.

In the design shown in FIG. 6 the gridiron is provided at the upper side with a hot-keeping grid, which has the advantage that finished food always is under the influence of heat from the charcoals and consequently of the wooden taste connected therewith if it is not consumed immediately after it is finished. At the same time it is secured that the distance to the heat source is maintained, so that the heat intensity on the food is kept at a suitable level.

Holders for the gridiron can be installed outdoors in a garden and on a balcony as well as indoors in a living room, so that it can be moved from one place to another as required. Such movement and installation require very little time.

A further holder can be of of the type used for sunshades (umbrellas) and can be combined therewith.

FIGS. 7–14 show a foot that can be unfolded in different variations and can also be adjusted to the ground level. The support foot shown in FIG. 7 comprises a receptacle 20 for the support device 8 for the gridiron 1 and has on each side of the receptacle 20 a hinge-joint D1 and D2, so that the foot can be folded together, as shown in FIG. 8, or arranged in different ways as required for a high-stability foot, as shown in FIGS. 9–14. Such arrangements of the parts H1 and H2 depend on the position of the support with regard to the grid.

Figure 12:
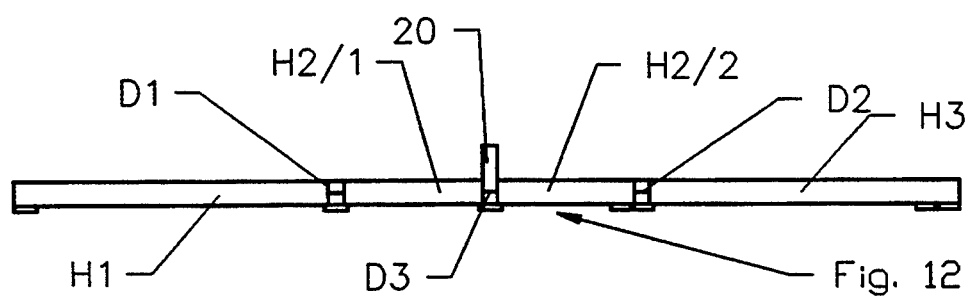
Figure 13:
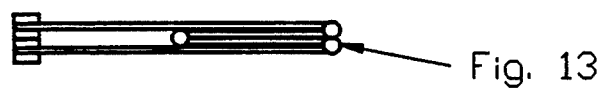
Figure 14:
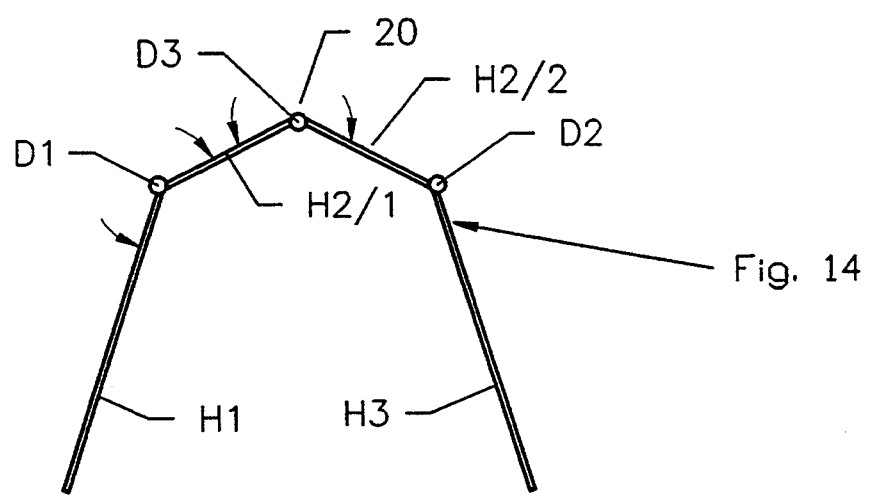

In FIGS. 12–14, the middle part H2 of the foot is rotatable around the receptacle 20, that is swingable about an axis D3, which allows the same rotation as D1 and D2. The part H2 of FIGS. 7–11 consists, in the design shown in FIGS. 12 and 13, of two parts H2/1 and H2/2, joined together at D3. The foot shown in FIG. 14 has a higher stability in the direction away from the receptacle 20.

FIGS. 15–17 show a further design of the foot of the present invention with a single rotating axis D3, around which two divided parts H1/1, H1/2 and H2/1, H2/2 are swingable. This cross-shaped foot has only one swing-axle, D3.

Although not shown in the drawings, the parts H1 and H2 are arranged in a way that allows loads to be put on top of them to increase their stability when the gridiron is moved to and from the fire. It would be possible to make the foot of a heavy metal, but that would make it more difficult to move the foot from a garden or back indoors.

Furthermore, it is possible to use outdoor holders fastened onto tubes or the like inserted into the ground.

We claim:

1. A gridiron for indoor and outdoor fireplaces, comprising:
    a handle for moving said gridiron vertically and horizontally;
    a parallelogram device for carrying out said vertical moving of said gridiron; and a locking device for locking said parallelogram device in position, wherein said gridiron remains in a horizontal plane in any position.

2. A gridiron according to claim 1, wherein the parallelogram device comprises:
   a horizontal rocking lever;
   a sleeve;
   a vertical pivot in said sleeve;
   a vertical arm that can be swiveled over said horizontal rocking lever and said vertical pivot; and
   two parallel supports, each of said supports rotatably arranged on said vertical arm.

3. A gridiron according to claim 2, wherein the rocking lever comprises:
   two extendable support rods connected with each other in a swivel point in which said support rods can be held together by means of a clamping device.

4. A gridiron according to one of claims 1 to 3, wherein the locking device comprises an adjustable hook and a permanent half-circular gear, in which said adjustable hook engages, said hook biased against said gear by means of a spring.

5. A gridiron according to claim 4, wherein said hook is adjusted by means of a lever positioned on said handle.

6. A gridiron according to claim 1, wherein the sleeve is fastened onto one of a garden grill and an indoor fireplace.

7. A gridiron according to claim 1, wherein the sleeve is mounted on an independent stud, that is freely movable and possess a high resistance against tilting.

8. A gridiron according to claim 1, further comprising a foldable foot consisting of plates, and wherein the sleeve is mounted on said foldable foot.

9. A gridiron according to claim 1, wherein the vertical swiveling range of the handle is adjustable.

10. A gridiron according to claim 1 further comprising an additional grid at a top of said gridiron for receiving food to be kept warm.

* * * * *